(12) United States Patent
Kothari

(10) Patent No.: US 8,194,056 B2
(45) Date of Patent: Jun. 5, 2012

(54) METHOD AND SYSTEM FOR WRITING DATA TO MEMS DISPLAY ELEMENTS

(75) Inventor: Manish Kothari, Cupertino, CA (US)

(73) Assignee: QUALCOMM MEMS Technologies Inc., San Diego, CA (US)

( * ) Notice: Subject to any disclaimer, the term of this patent is extended or adjusted under 35 U.S.C. 154(b) by 1185 days.

(21) Appl. No.: 11/350,712

(22) Filed: Feb. 9, 2006

(65) Prior Publication Data

US 2007/0182707 A1    Aug. 9, 2007

(51) Int. Cl.
*G09G 3/34*    (2006.01)

(52) U.S. Cl. ............. 345/204; 345/84; 345/85; 345/86; 345/108; 345/111; 356/519; 359/198; 359/290; 359/291

(58) Field of Classification Search ............. 345/84–86, 345/108–111, 204; 356/519; 359/209, 291, 359/198
See application file for complete search history.

(56) References Cited

U.S. PATENT DOCUMENTS

| | | | |
|---|---|---|---|
| 3,982,239 | A | 9/1976 | Sherr |
| 4,403,248 | A | 9/1983 | te Velde |
| 4,441,791 | A | 4/1984 | Hornbeck |
| 4,459,182 | A | 7/1984 | te Velde |
| 4,482,213 | A | 11/1984 | Piliavin et al. |
| 4,500,171 | A | 2/1985 | Penz et al. |
| 4,519,676 | A | 5/1985 | te Velde |
| 4,566,935 | A | 1/1986 | Hornbeck |
| 4,571,603 | A | 2/1986 | Hornbeck et al. |
| 4,596,992 | A | 6/1986 | Hornbeck |
| 4,615,595 | A | 10/1986 | Hornbeck |
| 4,662,746 | A | 5/1987 | Hornbeck |
| 4,681,403 | A | 7/1987 | te Velde et al. |
| 4,709,995 | A | 12/1987 | Kuribayashi et al. |
| 4,710,732 | A | 12/1987 | Hornbeck |
| 4,856,863 | A | 8/1989 | Sampsell et al. |
| 4,859,060 | A | 8/1989 | Katagiri et al. |
| 4,954,789 | A | 9/1990 | Sampsell |
| 4,956,619 | A | 9/1990 | Hornbeck |

(Continued)

FOREIGN PATENT DOCUMENTS

EP    0295802 A    12/1988

(Continued)

OTHER PUBLICATIONS

Miles et al., 5.3: Digital PaperTM: Reflective displays using interferometric modulation, SID Digest, vol. XXI, 2000 pp. 32-35.

(Continued)

*Primary Examiner* — Bipin Shalwala
*Assistant Examiner* — Afroza Chowdhury`
(74) *Attorney, Agent, or Firm* — Knobbe Martens Olson & Bear LLP

(57) ABSTRACT

Another embodiment has a method of driving a display device including an array of MEMS elements is disclosed. The MEMS elements are characterized by a preferred set of drive potential differences including preferred positive and preferred negative actuation potential differences, preferred positive and preferred negative hold potential differences, and a preferred release potential difference, where the preferred set of drive potential differences is symmetric about a voltage differing from 0V by an offset $\delta V$. Another embodiment has a reduced set of supply voltages are used, while maintaining the charge balancing effects of applying potential differences of opposite polarity without visible artifacts.

34 Claims, 9 Drawing Sheets

*Alternative Drive Potentials*

| | Column High (+6V) | Column Low (0V) |
|---|---|---|
| Row Bias (+3V - δV) | +Hold<br>+3V + δV | -Hold<br>-3V + δV |
| Row High (+6V) | -Release<br>0V | -Actuate<br>-6V |
| Row Low (0V - 2δV) | +Actuate<br>+6V + 2δV | +Release<br>+ 2δV |

U.S. PATENT DOCUMENTS

| | | | |
|---|---|---|---|
| 4,982,184 A | 1/1991 | Kirkwood | |
| 5,018,256 A | 5/1991 | Hornbeck | |
| 5,028,939 A | 7/1991 | Hornbeck et al. | |
| 5,037,173 A | 8/1991 | Sampsell et al. | |
| 5,055,833 A | 10/1991 | Hehlen et al. | |
| 5,061,049 A | 10/1991 | Hornbeck | |
| 5,078,479 A | 1/1992 | Vuilleumier | |
| 5,079,544 A | 1/1992 | DeMond et al. | |
| 5,083,857 A | 1/1992 | Hornbeck | |
| 5,096,279 A | 3/1992 | Hornbeck et al. | |
| 5,099,353 A | 3/1992 | Hornbeck | |
| 5,124,834 A | 6/1992 | Cusano et al. | |
| 5,142,405 A | 8/1992 | Hornbeck | |
| 5,142,414 A | 8/1992 | Koehler | |
| 5,162,787 A | 11/1992 | Thompson et al. | |
| 5,168,406 A | 12/1992 | Nelson | |
| 5,170,156 A | 12/1992 | DeMond et al. | |
| 5,172,262 A | 12/1992 | Hornbeck | |
| 5,179,274 A | 1/1993 | Sampsell | |
| 5,192,395 A | 3/1993 | Boysel et al. | |
| 5,192,946 A | 3/1993 | Thompson et al. | |
| 5,206,629 A | 4/1993 | DeMond et al. | |
| 5,212,582 A | 5/1993 | Nelson | |
| 5,214,419 A | 5/1993 | DeMond et al. | |
| 5,214,420 A | 5/1993 | Thompson et al. | |
| 5,216,537 A | 6/1993 | Hornbeck | |
| 5,226,099 A | 7/1993 | Mignardi et al. | |
| 5,227,900 A | 7/1993 | Inaba et al. | |
| 5,231,532 A | 7/1993 | Magel et al. | |
| 5,233,385 A | 8/1993 | Sampsell | |
| 5,233,456 A | 8/1993 | Nelson | |
| 5,233,459 A | 8/1993 | Bozler et al. | |
| 5,254,980 A | 10/1993 | Hendrix et al. | |
| 5,272,473 A | 12/1993 | Thompson et al. | |
| 5,278,652 A | 1/1994 | Urbanus et al. | |
| 5,280,277 A | 1/1994 | Hornbeck | |
| 5,285,196 A | 2/1994 | Gale | |
| 5,287,096 A | 2/1994 | Thompson et al. | |
| 5,296,950 A | 3/1994 | Lin et al. | |
| 5,305,640 A | 4/1994 | Boysel et al. | |
| 5,312,513 A | 5/1994 | Florence et al. | |
| 5,323,002 A | 6/1994 | Sampsell et al. | |
| 5,325,116 A | 6/1994 | Sampsell | |
| 5,327,286 A | 7/1994 | Sampsell et al. | |
| 5,331,454 A | 7/1994 | Hornbeck | |
| 5,339,116 A | 8/1994 | Urbanus et al. | |
| 5,365,283 A | 11/1994 | Doherty et al. | |
| 5,411,769 A | 5/1995 | Hornbeck | |
| 5,444,566 A | 8/1995 | Gale et al. | |
| 5,446,479 A | 8/1995 | Thompson et al. | |
| 5,448,314 A | 9/1995 | Heimbuch et al. | |
| 5,452,024 A | 9/1995 | Sampsell | |
| 5,454,906 A | 10/1995 | Baker et al. | |
| 5,457,493 A | 10/1995 | Leddy et al. | |
| 5,457,566 A | 10/1995 | Sampsell et al. | |
| 5,459,602 A | 10/1995 | Sampsell | |
| 5,461,411 A | 10/1995 | Florence et al. | |
| 5,488,505 A | 1/1996 | Engle | |
| 5,489,952 A | 2/1996 | Gove et al. | |
| 5,497,172 A | 3/1996 | Doherty et al. | |
| 5,497,197 A | 3/1996 | Gove et al. | |
| 5,499,062 A | 3/1996 | Urbanus | |
| 5,506,597 A | 4/1996 | Thompson et al. | |
| 5,515,076 A | 5/1996 | Thompson et al. | |
| 5,517,347 A | 5/1996 | Sampsell | |
| 5,523,803 A | 6/1996 | Urbanus et al. | |
| 5,526,051 A | 6/1996 | Gove et al. | |
| 5,526,172 A | 6/1996 | Kanack | |
| 5,526,688 A | 6/1996 | Boysel et al. | |
| 5,535,047 A | 7/1996 | Hornbeck | |
| 5,548,301 A | 8/1996 | Kornher et al. | |
| 5,551,293 A | 9/1996 | Boysel et al. | |
| 5,552,924 A | 9/1996 | Tregilgas | |
| 5,552,925 A | 9/1996 | Worley | |
| 5,563,398 A | 10/1996 | Sampsell | |
| 5,567,334 A | 10/1996 | Baker et al. | |
| 5,570,135 A | 10/1996 | Gove et al. | |
| 5,578,976 A | 11/1996 | Yao | |
| 5,581,272 A * | 12/1996 | Conner et al. | 345/85 |
| 5,583,688 A | 12/1996 | Hornbeck | |
| 5,589,852 A | 12/1996 | Thompson et al. | |
| 5,597,736 A | 1/1997 | Sampsell | |
| 5,598,565 A | 1/1997 | Reinhardt | |
| 5,600,383 A | 2/1997 | Hornbeck | |
| 5,602,671 A | 2/1997 | Hornbeck | |
| 5,606,441 A | 2/1997 | Florence et al. | |
| 5,608,468 A | 3/1997 | Gove et al. | |
| 5,610,438 A | 3/1997 | Wallace et al. | |
| 5,610,624 A | 3/1997 | Bhuva | |
| 5,610,625 A | 3/1997 | Sampsell | |
| 5,612,713 A | 3/1997 | Bhuva et al. | |
| 5,619,061 A | 4/1997 | Goldsmith et al. | |
| 5,619,365 A | 4/1997 | Rhoads et al. | |
| 5,619,366 A | 4/1997 | Rhoads et al. | |
| 5,629,790 A | 5/1997 | Neukermans et al. | |
| 5,633,652 A | 5/1997 | Kanbe et al. | |
| 5,636,052 A | 6/1997 | Arney et al. | |
| 5,638,084 A | 6/1997 | Kalt | |
| 5,638,946 A | 6/1997 | Zavracky | |
| 5,646,768 A | 7/1997 | Kaeriyama | |
| 5,650,881 A | 7/1997 | Hornbeck | |
| 5,654,741 A | 8/1997 | Sampsell et al. | |
| 5,657,099 A | 8/1997 | Doherty et al. | |
| 5,659,374 A | 8/1997 | Gale, Jr. et al. | |
| 5,665,997 A | 9/1997 | Weaver et al. | |
| 5,699,075 A | 12/1997 | Miyamoto | |
| 5,745,193 A | 4/1998 | Urbanus et al. | |
| 5,745,281 A | 4/1998 | Yi et al. | |
| 5,754,160 A | 5/1998 | Shimizu et al. | |
| 5,771,116 A | 6/1998 | Miller et al. | |
| 5,784,189 A | 7/1998 | Bozler et al. | |
| 5,784,212 A | 7/1998 | Hornbeck | |
| 5,808,780 A | 9/1998 | McDonald | |
| 5,818,095 A | 10/1998 | Sampsell | |
| 5,827,215 A | 10/1998 | Yoon | |
| 5,828,367 A | 10/1998 | Kuga | |
| 5,835,255 A | 11/1998 | Miles | |
| 5,842,088 A | 11/1998 | Thompson | |
| 5,867,302 A | 2/1999 | Fleming | |
| 5,912,758 A | 6/1999 | Knipe et al. | |
| 5,943,158 A | 8/1999 | Ford et al. | |
| 5,959,763 A | 9/1999 | Bozler et al. | |
| 5,966,235 A | 10/1999 | Walker | |
| 5,986,796 A | 11/1999 | Miles | |
| 6,028,690 A | 2/2000 | Carter et al. | |
| 6,038,056 A | 3/2000 | Florence et al. | |
| 6,040,937 A | 3/2000 | Miles | |
| 6,049,317 A | 4/2000 | Thompson et al. | |
| 6,055,090 A | 4/2000 | Miles | |
| 6,061,075 A | 5/2000 | Nelson et al. | |
| 6,099,132 A | 8/2000 | Kaeriyama | |
| 6,100,872 A | 8/2000 | Aratani et al. | |
| 6,113,239 A | 9/2000 | Sampsell et al. | |
| 6,147,790 A | 11/2000 | Meier et al. | |
| 6,160,833 A | 12/2000 | Floyd et al. | |
| 6,180,428 B1 | 1/2001 | Peeters et al. | |
| 6,201,633 B1 | 3/2001 | Peeters et al. | |
| 6,232,936 B1 | 5/2001 | Gove et al. | |
| 6,275,326 B1 | 8/2001 | Bhalla et al. | |
| 6,282,010 B1 | 8/2001 | Sulzbach et al. | |
| 6,295,154 B1 | 9/2001 | Laor et al. | |
| 6,304,297 B1 | 10/2001 | Swan | |
| 6,323,982 B1 | 11/2001 | Hornbeck | |
| 6,327,071 B1 | 12/2001 | Koichi | |
| 6,356,085 B1 | 3/2002 | Ryat et al. | |
| 6,356,254 B1 | 3/2002 | Kimura | |
| 6,429,601 B1 | 8/2002 | Friend et al. | |
| 6,433,917 B1 | 8/2002 | Mei et al. | |
| 6,447,126 B1 | 9/2002 | Hornbeck | |
| 6,465,355 B1 | 10/2002 | Horsley | |
| 6,466,358 B2 | 10/2002 | Tew | |
| 6,473,274 B1 | 10/2002 | Maimone et al. | |
| 6,480,177 B2 | 11/2002 | Doherty et al. | |
| 6,496,122 B2 | 12/2002 | Sampsell | |
| 6,501,107 B1 | 12/2002 | Sinclair et al. | |
| 6,507,330 B1 | 1/2003 | Handschy et al. | |
| 6,507,331 B1 | 1/2003 | Schlangen et al. | |

| | | | | | | |
|---|---|---|---|---|---|---|
| 6,545,335 B1 | 4/2003 | Chua et al. | | 2002/0179421 A1 | 12/2002 | Williams et al. |
| 6,548,908 B2 | 4/2003 | Chua et al. | | 2002/0186108 A1 | 12/2002 | Hallbjorner |
| 6,549,338 B1 | 4/2003 | Wolverton et al. | | 2003/0004272 A1 | 1/2003 | Power |
| 6,552,840 B2 | 4/2003 | Knipe | | 2003/0020699 A1 | 1/2003 | Nakatani et al. |
| 6,574,033 B1 | 6/2003 | Chui et al. | | 2003/0043157 A1 | 3/2003 | Miles |
| 6,589,625 B1 | 7/2003 | Kothari et al. | | 2003/0072070 A1 | 4/2003 | Miles |
| 6,593,934 B1 | 7/2003 | Liaw et al. | | 2003/0122773 A1 | 7/2003 | Washio et al. |
| 6,600,201 B2 | 7/2003 | Hartwell et al. | | 2003/0137215 A1 | 7/2003 | Cabuz |
| 6,606,175 B1 | 8/2003 | Sampsell et al. | | 2003/0137521 A1 | 7/2003 | Zehner et al. |
| 6,625,047 B2 | 9/2003 | Coleman, Jr. | | 2003/0189536 A1 | 10/2003 | Ruigt |
| 6,630,786 B2 | 10/2003 | Cummings et al. | | 2003/0202264 A1 | 10/2003 | Weber et al. |
| 6,632,698 B2 | 10/2003 | Ives | | 2003/0202265 A1 | 10/2003 | Reboa et al. |
| 6,636,187 B2 | 10/2003 | Tajima et al. | | 2003/0202266 A1 | 10/2003 | Ring et al. |
| 6,643,069 B2 | 11/2003 | Dewald | | 2004/0008396 A1 | 1/2004 | Stappaerts |
| 6,650,455 B2 | 11/2003 | Miles | | 2004/0021658 A1 | 2/2004 | Chen |
| 6,666,561 B1 | 12/2003 | Blakley | | 2004/0022044 A1 | 2/2004 | Yasuoka et al. |
| 6,674,090 B1 | 1/2004 | Chua et al. | | 2004/0027701 A1 | 2/2004 | Ishikawa |
| 6,674,562 B1 | 1/2004 | Miles | | 2004/0037490 A1 * | 2/2004 | Tochio et al. .................. 385/16 |
| 6,680,792 B2 | 1/2004 | Miles | | 2004/0051929 A1 | 3/2004 | Sampsell et al. |
| 6,710,908 B2 | 3/2004 | Miles et al. | | 2004/0058532 A1 | 3/2004 | Miles et al. |
| 6,741,377 B2 | 5/2004 | Miles | | 2004/0080807 A1 | 4/2004 | Chen et al. |
| 6,741,384 B1 | 5/2004 | Martin et al. | | 2004/0136596 A1 | 7/2004 | Oneda et al. |
| 6,741,503 B1 | 5/2004 | Farris et al. | | 2004/0145049 A1 | 7/2004 | McKinnell et al. |
| 6,747,785 B2 | 6/2004 | Chen et al. | | 2004/0145553 A1 | 7/2004 | Sala et al. |
| 6,762,873 B1 | 7/2004 | Coker et al. | | 2004/0147056 A1 | 7/2004 | McKinnell et al. |
| 6,775,174 B2 | 8/2004 | Huffman et al. | | 2004/0160143 A1 | 8/2004 | Shreeve et al. |
| 6,778,155 B2 | 8/2004 | Doherty et al. | | 2004/0174583 A1 | 9/2004 | Chen et al. |
| 6,781,643 B1 | 8/2004 | Watanabe et al. | | 2004/0179281 A1 | 9/2004 | Reboa |
| 6,787,384 B2 | 9/2004 | Okumura | | 2004/0212026 A1 | 10/2004 | Van Brocklin et al. |
| 6,787,438 B1 | 9/2004 | Nelson | | 2004/0217378 A1 | 11/2004 | Martin et al. |
| 6,788,520 B1 | 9/2004 | Behin et al. | | 2004/0217919 A1 | 11/2004 | Piehl et al. |
| 6,794,119 B2 | 9/2004 | Miles | | 2004/0218251 A1 | 11/2004 | Piehl et al. |
| 6,811,267 B1 | 11/2004 | Allen et al. | | 2004/0218334 A1 | 11/2004 | Martin et al. |
| 6,813,060 B1 | 11/2004 | Garcia et al. | | 2004/0218341 A1 | 11/2004 | Martin et al. |
| 6,819,469 B1 | 11/2004 | Koba | | 2004/0223204 A1 | 11/2004 | Mao et al. |
| 6,822,628 B2 | 11/2004 | Dunphy et al. | | 2004/0227493 A1 | 11/2004 | Van Brocklin et al. |
| 6,829,132 B2 | 12/2004 | Martin et al. | | 2004/0240032 A1 | 12/2004 | Miles |
| 6,853,129 B1 | 2/2005 | Cummings et al. | | 2004/0240138 A1 | 12/2004 | Martin et al. |
| 6,855,610 B2 | 2/2005 | Tung et al. | | 2004/0245588 A1 | 12/2004 | Nikkel et al. |
| 6,859,218 B1 | 2/2005 | Luman et al. | | 2004/0246765 A1 * | 12/2004 | Kato ............................ 365/149 |
| 6,861,277 B1 | 3/2005 | Monroe et al. | | 2004/0263944 A1 | 12/2004 | Miles et al. |
| 6,862,022 B2 | 3/2005 | Slupe | | 2005/0001828 A1 | 1/2005 | Martin et al. |
| 6,862,029 B1 | 3/2005 | D'Souza et al. | | 2005/0012577 A1 | 1/2005 | Pillans et al. |
| 6,867,896 B2 | 3/2005 | Miles | | 2005/0024301 A1 | 2/2005 | Funston |
| 6,870,581 B2 | 3/2005 | Li et al. | | 2005/0038950 A1 | 2/2005 | Adelmann |
| 6,903,860 B2 | 6/2005 | Ishii | | 2005/0057442 A1 | 3/2005 | Way |
| 7,034,783 B2 | 4/2006 | Gates et al. | | 2005/0068583 A1 | 3/2005 | Gutkowski et al. |
| 7,123,216 B1 | 10/2006 | Miles | | 2005/0069209 A1 | 3/2005 | Damera-Venkata et al. |
| 7,161,728 B2 | 1/2007 | Sampsell et al. | | 2005/0077505 A1 * | 4/2005 | Thurm ........................ 254/89 H |
| 7,283,112 B2 * | 10/2007 | Starkweather et al. ......... 345/84 | | 2005/0116924 A1 | 6/2005 | Sauvante et al. |
| 7,289,256 B2 * | 10/2007 | Cummings et al. ........... 359/238 | | 2005/0157305 A1 * | 7/2005 | Yu et al. ..................... 356/480 |
| 7,302,157 B2 * | 11/2007 | Chui .............................. 385/147 | | 2005/0206991 A1 | 9/2005 | Chui et al. |
| 7,398,019 B2 * | 7/2008 | Tochio et al. .................. 398/56 | | 2005/0286113 A1 | 12/2005 | Miles |
| 7,400,489 B2 | 7/2008 | Van Brocklin et al. | | 2005/0286114 A1 | 12/2005 | Miles |
| 7,428,054 B2 * | 9/2008 | Yu et al. ........................ 356/480 | | 2006/0044246 A1 | 3/2006 | Mignard |
| 7,446,928 B2 * | 11/2008 | Kimura et al. ................ 359/291 | | 2006/0044298 A1 | 3/2006 | Mignard et al. |
| 7,453,579 B2 * | 11/2008 | Kothari et al. ................ 356/519 | | 2006/0044928 A1 | 3/2006 | Chui et al. |
| 7,541,614 B2 * | 6/2009 | Kato ............................... 257/66 | | 2006/0056000 A1 | 3/2006 | Mignard |
| 2001/0003487 A1 | 6/2001 | Miles | | 2006/0057754 A1 * | 3/2006 | Cummings ..................... 438/48 |
| 2001/0026250 A1 | 10/2001 | Inoue et al. | | 2006/0066542 A1 | 3/2006 | Chui |
| 2001/0034075 A1 | 10/2001 | Onoya | | 2006/0066559 A1 * | 3/2006 | Chui et al. .................... 345/108 |
| 2001/0040536 A1 | 11/2001 | Tajima et al. | | 2006/0066560 A1 * | 3/2006 | Gally et al. .................. 345/108 |
| 2001/0043171 A1 | 11/2001 | Van Gorkom et al. | | 2006/0066561 A1 * | 3/2006 | Chui et al. .................... 345/108 |
| 2001/0046081 A1 | 11/2001 | Hayashi et al. | | 2006/0066594 A1 | 3/2006 | Tyger |
| 2001/0051014 A1 | 12/2001 | Behin et al. | | 2006/0066597 A1 | 3/2006 | Sampsell |
| 2001/0052887 A1 | 12/2001 | Tsutsui et al. | | 2006/0066598 A1 | 3/2006 | Floyd |
| 2002/0000959 A1 | 1/2002 | Colgan et al. | | 2006/0066601 A1 | 3/2006 | Kothari |
| 2002/0005827 A1 | 1/2002 | Kobayashi | | 2006/0066863 A1 * | 3/2006 | Cummings et al. ........... 356/450 |
| 2002/0012159 A1 | 1/2002 | Tew | | 2006/0066935 A1 * | 3/2006 | Cummings et al. ........... 359/291 |
| 2002/0015215 A1 | 2/2002 | Miles | | 2006/0066937 A1 | 3/2006 | Chui |
| 2002/0024711 A1 | 2/2002 | Miles | | 2006/0066938 A1 | 3/2006 | Chui |
| 2002/0036304 A1 | 3/2002 | Ehmke et al. | | 2006/0067648 A1 | 3/2006 | Chui et al. |
| 2002/0050882 A1 | 5/2002 | Hyman et al. | | 2006/0067653 A1 | 3/2006 | Gally et al. |
| 2002/0054424 A1 | 5/2002 | Miles et al. | | 2006/0077127 A1 | 4/2006 | Sampsell et al. |
| 2002/0075226 A1 | 6/2002 | Lippincott | | 2006/0077145 A1 * | 4/2006 | Floyd et al. .................... 345/85 |
| 2002/0075555 A1 | 6/2002 | Miles | | 2006/0077146 A1 * | 4/2006 | Palmateer ....................... 345/85 |
| 2002/0093722 A1 | 7/2002 | Chan et al. | | 2006/0077147 A1 * | 4/2006 | Palmateer et al. ............... 345/85 |
| 2002/0097133 A1 | 7/2002 | Charvet et al. | | 2006/0077401 A1 * | 4/2006 | Kothari et al. ................. 356/614 |
| 2002/0126364 A1 | 9/2002 | Miles | | 2006/0077505 A1 * | 4/2006 | Chui et al. .................... 359/239 |

| | | | |
|---|---|---|---|
| 2006/0077520 A1 | 4/2006 | Chui et al. | |
| 2006/0077523 A1* | 4/2006 | Cummings et al. | 359/291 |
| 2006/0103613 A1 | 5/2006 | Chui | |
| 2006/0250335 A1 | 11/2006 | Stewart et al. | |
| 2006/0250350 A1 | 11/2006 | Kothari et al. | |
| 2007/0126673 A1* | 6/2007 | Djordjev et al. | 345/84 |
| 2007/0147688 A1 | 6/2007 | Mithran | |
| 2007/0274731 A1* | 11/2007 | Boffi et al. | 398/188 |
| 2009/0219309 A1 | 9/2009 | Sampsell | |
| 2009/0219600 A1 | 9/2009 | Gally et al. | |
| 2009/0225069 A1 | 9/2009 | Sampsell | |
| 2009/0273596 A1 | 11/2009 | Cummings | |
| 2010/0026680 A1 | 2/2010 | Chui et al. | |
| 2010/0315398 A1 | 12/2010 | Chui et al. | |

FOREIGN PATENT DOCUMENTS

| | | |
|---|---|---|
| EP | 0300754 A2 | 1/1989 |
| EP | 0306308 A2 | 3/1989 |
| EP | 0318050 A | 5/1989 |
| EP | 0 417 523 A | 3/1991 |
| EP | 0 467 048 A | 1/1992 |
| EP | 0570906 A | 11/1993 |
| EP | 0608056 A1 | 7/1994 |
| EP | 0655725 A1 | 5/1995 |
| EP | 0667548 A1 | 8/1995 |
| EP | 0725380 A1 | 8/1996 |
| EP | 0852371 A1 | 7/1998 |
| EP | 0911794 A1 | 4/1999 |
| EP | 0 017 038 A | 7/2000 |
| EP | 1 091 342 | 4/2001 |
| EP | 1 134 721 | 9/2001 |
| EP | 1146533 A | 10/2001 |
| EP | 1 239 448 | 9/2002 |
| EP | 1 280 129 | 1/2003 |
| EP | 1343190 A | 9/2003 |
| EP | 1345197 A | 9/2003 |
| EP | 1381023 A | 1/2004 |
| EP | 1 414 011 | 4/2004 |
| EP | 1473691 A2 | 11/2004 |
| FR | 2851683 A1 | 8/2004 |
| GB | 2401200 A | 11/2004 |
| JP | 2000-075963 | 4/2000 |
| JP | 2002-341267 | 11/2002 |
| JP | 2004-29571 | 1/2004 |
| WO | WO 95/30924 | 11/1995 |
| WO | WO 97/17628 | 5/1997 |
| WO | WO 99/52006 A3 | 10/1999 |
| WO | WO 01/73937 A | 10/2001 |
| WO | WO 02/089103 | 11/2002 |
| WO | WO 03/007049 A1 | 1/2003 |
| WO | WO 03/015071 A2 | 2/2003 |
| WO | WO 03/044765 A2 | 5/2003 |
| WO | WO 03/060940 A | 7/2003 |
| WO | WO 03/069413 A1 | 8/2003 |
| WO | WO 03/073151 A1 | 9/2003 |
| WO | WO 03/079323 A | 9/2003 |
| WO | WO 03/090199 A1 | 10/2003 |
| WO | WO 03/103013 | 12/2003 |
| WO | WO 2004/006003 A1 | 1/2004 |
| WO | WO 2004/026757 A | 4/2004 |
| WO | WO 2004/026757 A2 | 4/2004 |
| WO | WO 2004/049034 A1 | 6/2004 |
| WO | WO 2004/054088 | 6/2004 |

OTHER PUBLICATIONS

Chen et al., Low peak current driving scheme for passive matrix-OLED, SID International Symposium Digest of Technical Papers, May 2003, pp. 504-507.

Miles, MEMS-based interferometric modulator for display applications, Part of the SPIE Conference on Micromachined Devices and Components, vol. 3876, pp. 20-28 (1999).

International Search Report and Written Opinion dated Jun. 22, 2007.

IPRP for PCT/US07/001115 filed Jan. 16, 2007.

Bains, "Digital Paper Display Technology holds Promise for Portables", CommsDesign EE Times (2000).

Lieberman, "MEMS Display Looks to give PDAs Sharper Image" EE Times (2004).

Lieberman, "Microbridges at heart of new MEMS displays" EE Times (2004).

Seeger et al., "Stabilization of Electrostatically Actuated Mechanical Devices", (1997) International Conference on Solid State Sensors and Actuators; vol. 2, pp. 1133-1136.

Peroulis et al., Low contact resistance series MEMS switches, 2002, pp. 223-226, vol. 1, IEEE MTT-S International Microwave Symposium Digest, New York, NY.

Notice of Reasons for Rejection dated Aug. 23, 2011 in Japanese App. No. 2008-554244.

* cited by examiner

Preferred Drive Potentials

|  | Column High (+6V) | Column Low (0V) |
|---|---|---|
| Row Bias (+3V) | +Hold +3V | -Hold -3V |
| Row High (+6V) | Release 0V | -Actuate -6V |
| Row Low (0V) | +Actuate +6V | Release 0V |

Preferred Drive Potentials

|  | Column High (+6V + δV) | Column Low (0V + δV) |
|---|---|---|
| Row Bias (+3V) | +Hold<br>+3V + δV | -Hold<br>-3V + δV |
| Row High (+6V) | Release<br>0V + δV | -Actuate<br>-6V + δV |
| Row Low (+0V) | +Actuate<br>+6V + δV | Release<br>0V + δV |

Alternative Drive Potentials

|  | Column High (+6V + 2δV) | Column Low 0 |
|---|---|---|
| Row Hold (+3V) | +Hold<br>+3V + 2δV | -Hold<br>-3V |
| Row High (+6V) | -Release<br>0V + 2δV | -Actuate<br>-6V |
| Row Low (0V) | +Actuate<br>+6V + 2δV | +Release<br>0V |

FIG. 9

Alternative Drive Potentials

|  | Column High (+6V) | Column Low (0V) |
|---|---|---|
| Row Bias (+3V - δV) | +Hold<br>+3V + δV | -Hold<br>-3V + δV |
| Row High (+6V) | -Release<br>0V | -Actuate<br>-6V |
| Row Low (0V - 2δV) | +Actuate<br>+6V + 2δV | +Release<br>+ 2δV |

FIG. 10

METHOD AND SYSTEM FOR WRITING DATA TO MEMS DISPLAY ELEMENTS

BACKGROUND

Microelectromechanical systems (MEMS) include micro mechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

One embodiment has a method of driving a display device including a set of MEMS display elements configured as an array of rows and columns of MEMS elements, where the MEMS elements are characterized by a preferred set of drive potential differences including preferred positive and preferred negative actuation potential differences, preferred positive and preferred negative hold potential differences, and a preferred release potential difference, where the preferred set of drive potential differences is symmetric about a voltage differing from 0V by an offset δV and where drive potential differences are applied to each MEMS element as a difference between a column voltage and a row voltage. The method includes generating a set of four different voltage levels, writing display data to the array by applying voltages to each column of the array and each row of the array so as to apply first and second actuation potential differences, first and second hold potential differences, and first and second release potential differences to the array, where the voltages are selected only from the set of four different voltage levels, and where first and second hold potentials are of opposite polarity.

Another embodiment has a microelectromechanical system (MEMS) display device including an array of MEMS display elements configured as an array of rows and columns of MEMS elements, where the MEMS elements are characterized by a preferred set of drive potential differences including preferred positive and preferred negative actuation potential differences, preferred positive and preferred negative hold potential differences, and a preferred release potential difference, where the preferred set of drive potential differences is symmetric about a voltage differing from 0V by an offset δV, and an array controller configured to write display data to the array by applying voltages to each column of the array and each row of the array so as to apply first and second actuation potential differences, first and second hold potential differences, and first and second release potential differences, where the voltages are selected from a set of only four different voltage levels, and where first and second hold potentials are of opposite polarity.

Another embodiment has a method of driving a display device including a set of MEMS display elements configured as an array of rows and columns of MEMS elements, where the MEMS elements are characterized by a preferred set of drive potential differences including preferred positive and preferred negative actuation potential differences, preferred positive and preferred negative hold potential differences, and a preferred release potential difference, where the preferred set of drive potential differences is symmetric about a voltage differing from 0V by an offset δV and where drive potential differences are applied to each MEMS element as a difference between a column voltage and a row voltage. The method includes generating a set of four different voltage levels, writing display data to the array by applying voltages to each column of the array and each row of the array so as to apply first and second actuation potential differences, first and second hold potential differences, and first and second release potential differences, where the voltages are selected only from the set of four different voltage levels, and where at least one of first and second actuation potentials, first and second hold potentials, and first and second hold potentials are of opposite polarity and are symmetric about the offset voltage δV.

Figure 3:
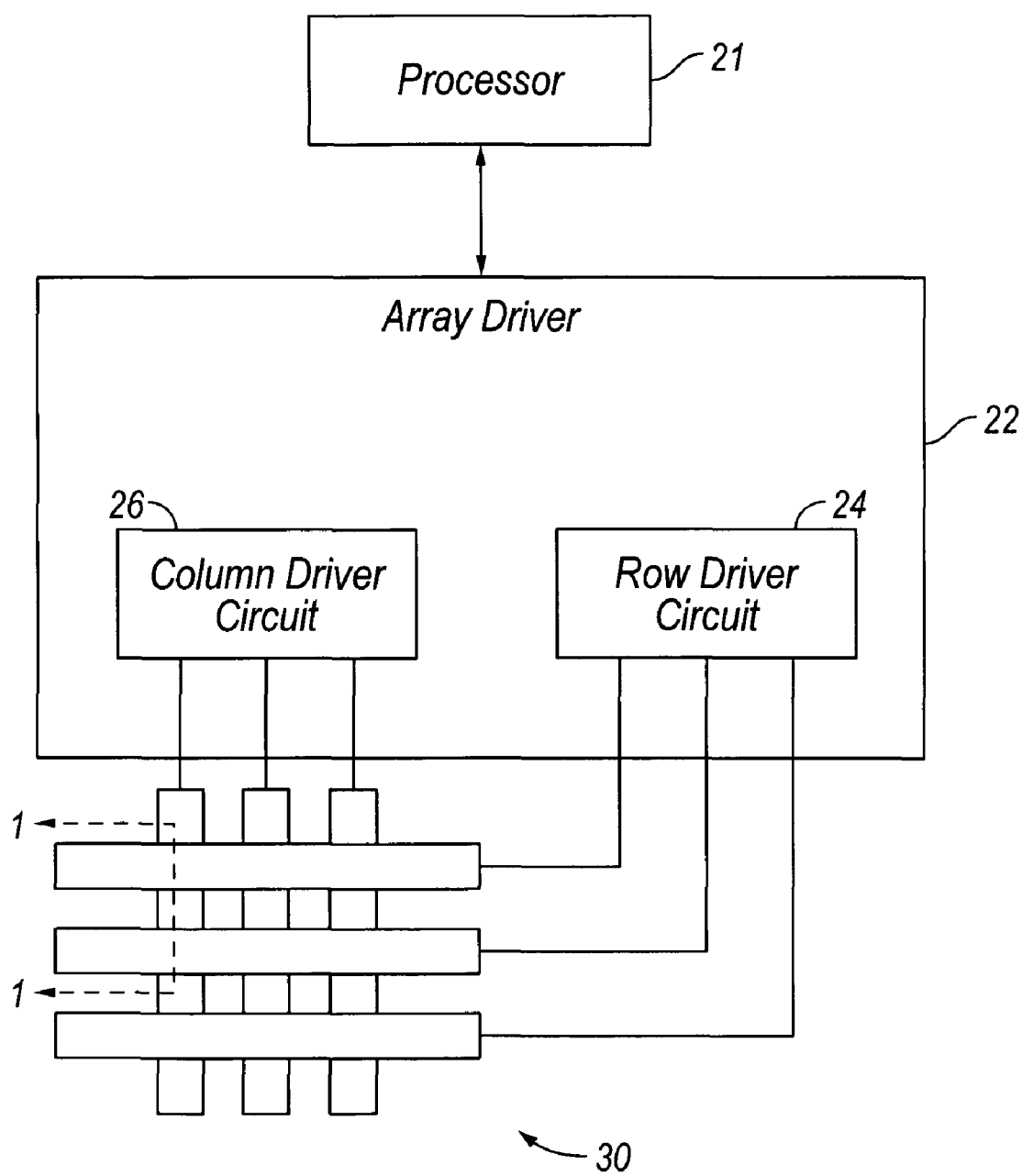
FIG. 3 is a system block diagram illustrating one embodiment of an electronic device incorporating a 3×3 interferometric modulator display.

FIG.s 6A and 6B illustrate one exemplary timing diagram for row and column signals that may be used to write a frame of display data to the 3×3 interferometric modulator display of FIG. 3.

Figure 1:
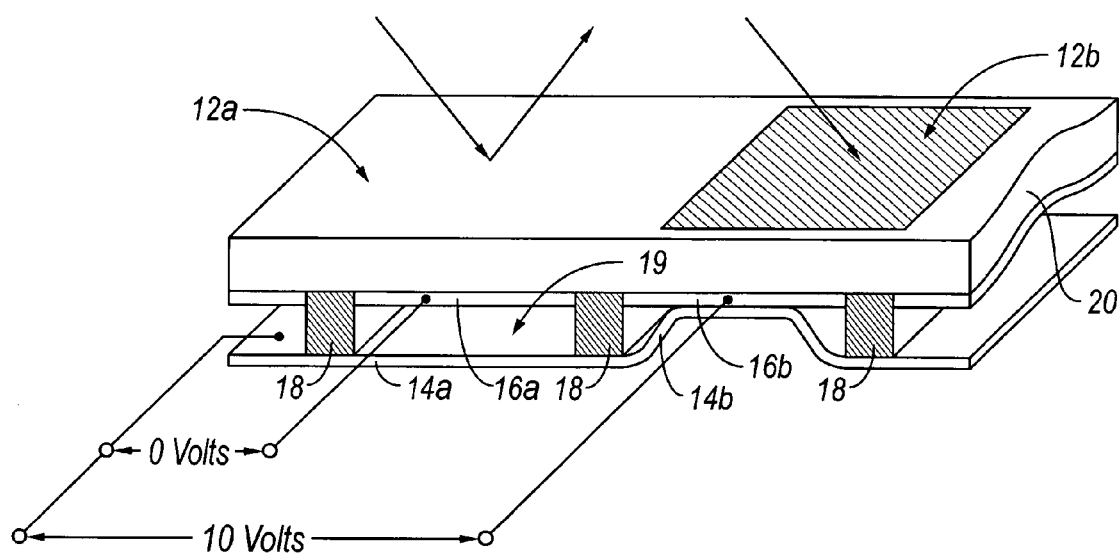
FIG. 1 is an isometric view depicting a portion of one embodiment of an interferometric modulator display in which a movable reflective layer of a first interferometric modulator is in a released position and a movable reflective layer of a second interferometric modulator is in an actuated position.
Figures 7, 8:
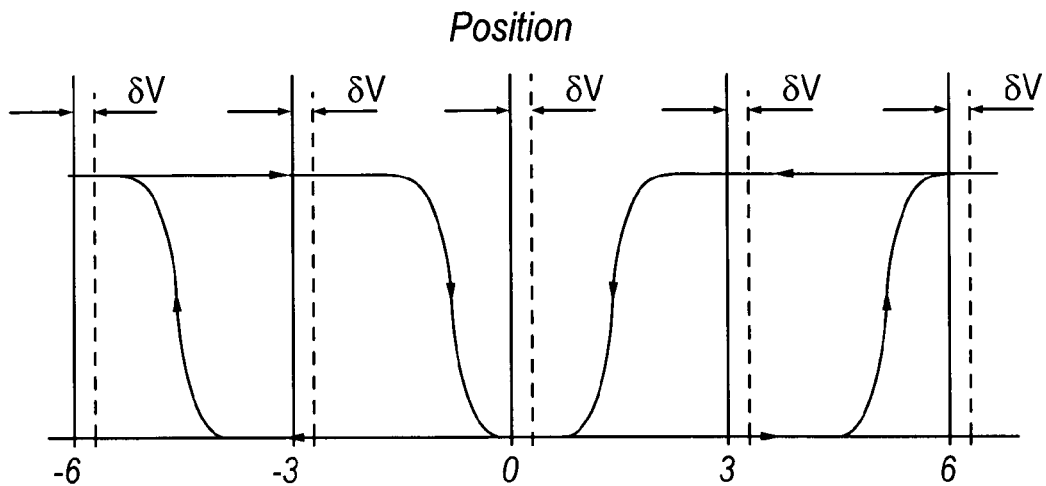

FIG. 7 is a diagram of movable mirror position versus applied voltage for one exemplary embodiment of an interferometric modulator of FIG. 1.

FIG. 8 is an illustration of a set of row and column voltages that may be used to drive an interferometric modulator display.

FIG. 9 is an illustration of a set of row and column voltages that may be used to drive an interferometric modulator display.

FIG. 10 is an illustration of a set of row and column voltages that may be used to drive an interferometric modulator display.

Figure 11A:
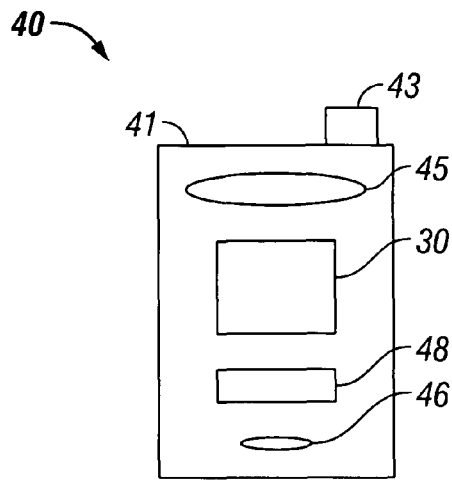
Figure 11B:
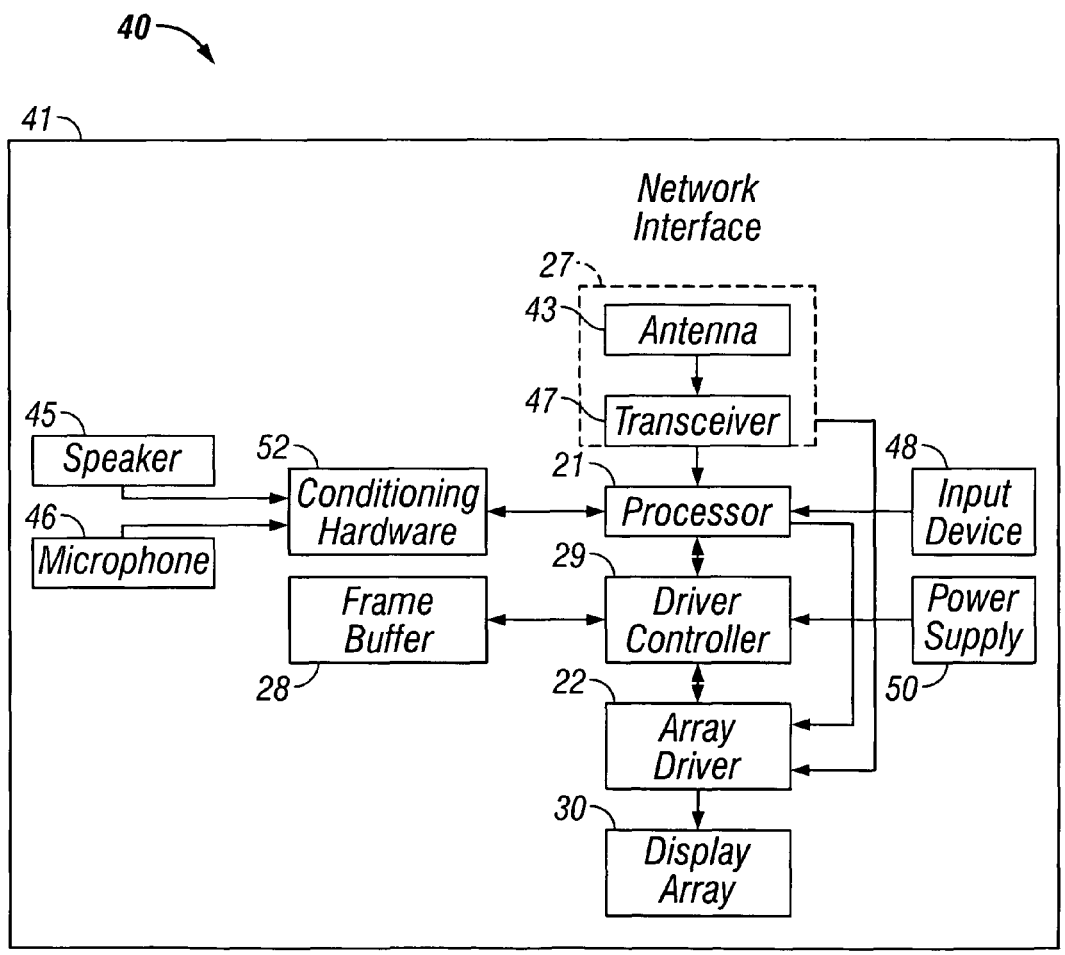

FIGS. 11A and 11B are system block diagrams illustrating an embodiment of a visual display device comprising a plurality of interferometric modulators.

DETAILED DESCRIPTION OF PREFERRED EMBODIMENTS

The following detailed description is directed to certain specific embodiments of the invention. However, the invention can be embodied in a multitude of different ways. In this description, reference is made to the drawings where like parts are designated with like numerals throughout. As will be apparent from the following description, the invention may be implemented in any device that is configured to display an image, whether in motion (e.g., video) or stationary (e.g., still image), and whether textual or pictorial. More particularly, it is contemplated that the invention may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

One interferometric modulator display embodiment including an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, where each pixel includes a MEMS interferometric modulator. In some embodiments, an interferometric modulator display includes a row/column array of these interferometric modulators. Each interferometric modulator includes a pair of reflective layers positioned at a variable and controllable distance from each other to form a resonant optical cavity with at least one variable dimension.

In one embodiment, one of the reflective layers may be moved between two positions. In the first position, referred to herein as the released state, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a released position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers are separated from the fixed metal layers by a defined air gap 19. Another embodiment has a highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2A:
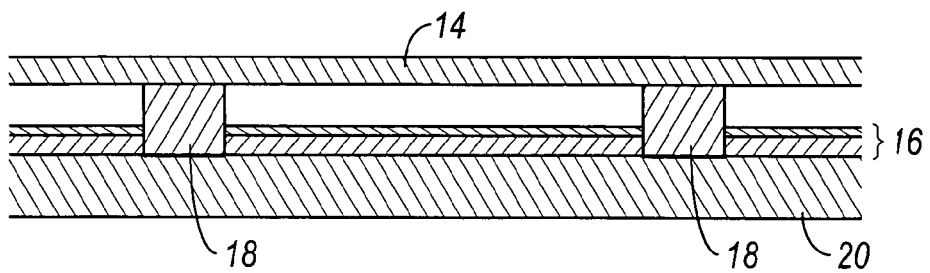
FIG. 2A is a cross section of the device of FIG. 1.
Figure 2B:
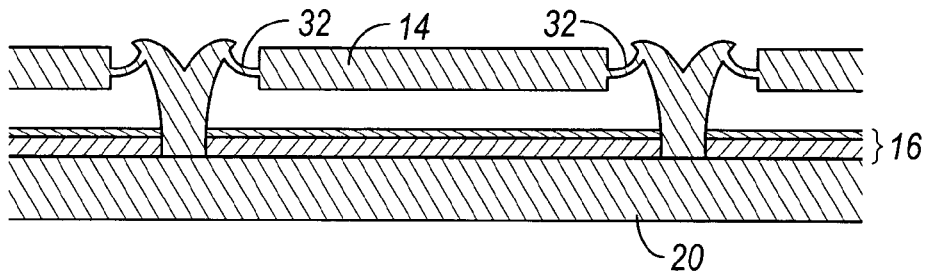
FIG. 2B is a cross section of an alternative embodiment of an interferometric modulator.
Figure 2C:
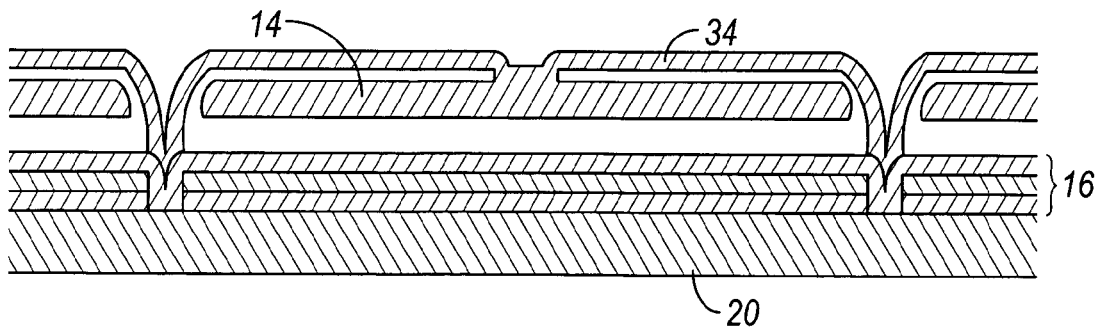
FIG. 2C is a cross section of another alternative embodiment of an interferometric modulator.
Figure 2D:
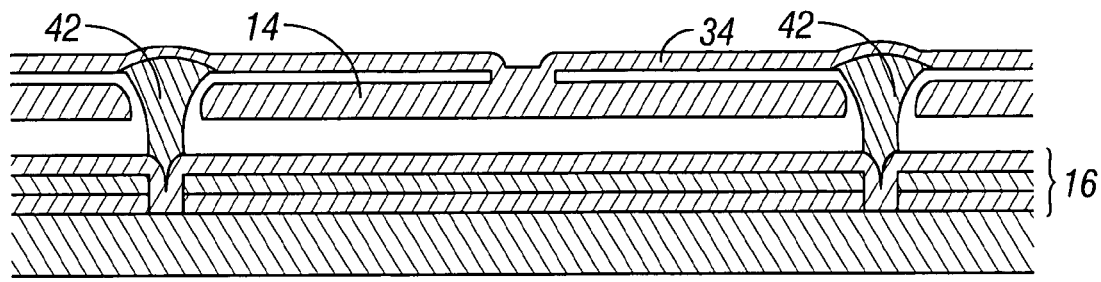
FIG. 2D is a cross section of yet another alternative embodiment of an interferometric modulator.
Figure 2E:
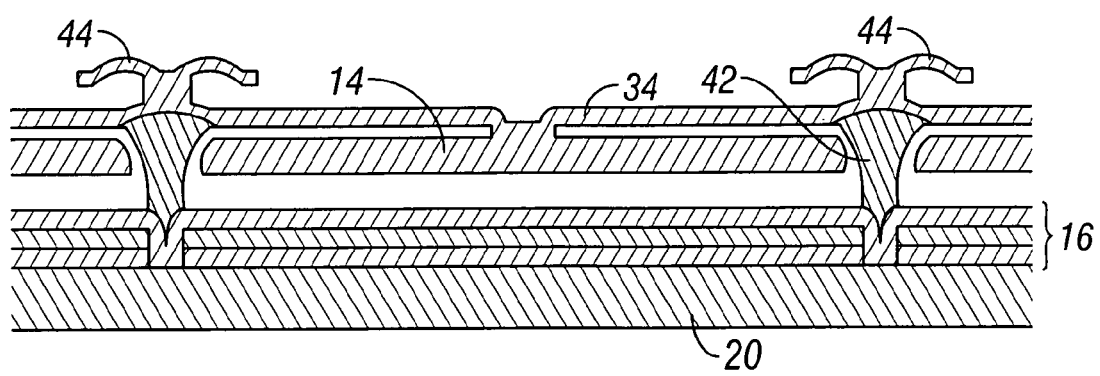
FIG. 2E is a cross section of an additional alternative embodiment of an interferometric modulator.

The details of the structure of interferometric modulators that operate in accordance with the principles set forth above may vary widely. For example, FIGS. 2A-2E illustrate five different embodiments of the movable reflective layer 14 and its supporting structures. FIG. 2A is a cross section of the embodiment of FIG. 1, where a strip of metal material 14 is deposited on orthogonally extending supports 18. In FIG. 2B, the moveable reflective layer 14 is attached to supports at the corners only, on tethers 32. In FIG. 2C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 2D has support post plugs 42 upon which the deformable layer 34 rests. The movable reflective layer 14 remains suspended over the cavity, as in FIGS. 2A-2C, but the deformable layer 34 does not form the support posts by filling holes between the deformable layer 34 and the optical stack 16. Rather, the support posts are formed of a planarization material, which is used to form support post plugs 42. The embodiment illustrated in FIG. 2E is based on the embodiment shown in FIG. 2D, but may also be adapted to work with any of the embodiments illustrated in FIGS. 2A-2C, as well as additional embodiments not shown. In the embodiment shown in FIG. 2E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 2, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 2E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 2C-2E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

FIGS. 3 through 6 illustrate one exemplary process and system for using an array of interferometric modulators in a display application. FIG. 3 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 3.

Figures 4, 5:
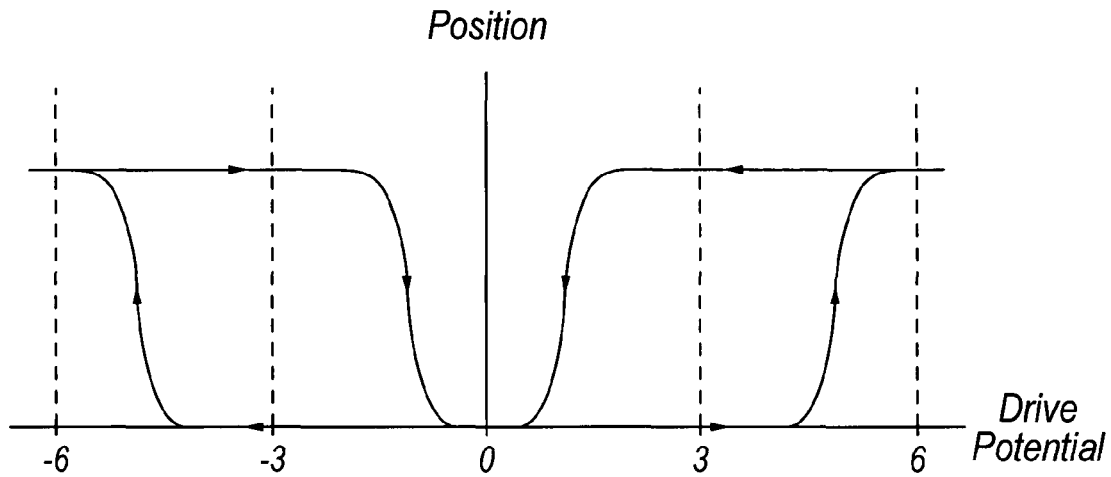
FIG. 4 is a diagram of movable mirror position versus applied voltage for one exemplary embodiment of an interferometric modulator of FIG. 1.
FIG. 5 is an illustration of a set of row and column voltages that may be used to drive an interferometric modulator display.

For MEMS interferometric modulators, the row/column actuation protocol may take advantage of a hysteresis property of these devices illustrated in FIG. 4. It may require, for example, a 6 volt potential difference to cause a movable layer to deform from the released state to the actuated state. However, when the voltage is reduced from that value, the movable layer maintains its state as the voltage drops back below 6 volts. In the exemplary embodiment of FIG. 3, the movable layer does not release completely until the voltage drops below 1 volt. There is thus a range of voltage, about 2 to 4 V in the example illustrated in FIG. 4, where there exists a window of applied voltage within which the device is stable in either the released or actuated state. This is referred to herein as the "hysteresis window" or "stability window." It will be appreciated that the "drive potential" of FIG. 4 is defined as the difference between the potential of the stationary electrode and the potential of the deformable electrode. A "0 volt" drive potential thus means that a given row and column have the same absolute voltage relative to a reference common such as ground. A "0 volt" drive potential does not imply that either a row or column is necessarily at an absolute voltage of 0 volts relative to ground or any other reference. By convention in this disclosure, a positive polarity drive potential means the column electrode is at a higher potential than the row electrode. A negative polarity drive potential means the row electrode is at a higher potential than the column electrode. For a display array having the hysteresis characteristics of FIG. 4, the row/column actuation protocol can be designed such that during row strobing, pixels in the strobed row that are to be actuated are exposed to a voltage difference of about 6 volts, and pixels that are to be released are exposed to a voltage difference of close to zero volts. After the strobe, the pixels are exposed to a steady state voltage difference of about 3 volts such that they remain in whatever state the row strobe put them in. After being written, each pixel sees a potential difference within the "stability window" of 2-4 volts in this example. This feature makes the pixel design illustrated in FIG. 1 stable under the same applied voltage conditions in either an actuated or released pre-existing state. Since each pixel of the interferometric modulator, whether in the actuated or released state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. Another embodiment has a row pulse is then applied to the row 1 electrode, actuating the pixels corresponding to the asserted column lines. The asserted set of column electrodes is then changed to correspond to the desired set of actuated pixels in the second row. Another embodiment has a pulse that is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. Another embodiment has a wide variety of protocols for driving row and column electrodes of pixel arrays to produce display frames are also well known and may be used in conjunction with the present invention.

FIGS. 5 and 6 illustrate one possible actuation protocol for creating a display frame on the 3×3 array of FIG. 3. FIG. 4 is a diagram of movable mirror position versus applied voltage showing a hysteresis characteristic. FIG. 5 is a table showing column and row voltages used to create preferred drive potentials for the embodiment of FIG. 3, where each drive potential is the difference between the associated column voltage and the associated row voltage. As shown, the column voltages are 6V and 0V, and the row voltages are 3V, 6V, and 0V, and are used to create the preferred positive and preferred negative actuation potentials (+6V and −6V), the preferred positive and preferred negative hold potentials (+3V and −3V), and the preferred release potential (0V). For convenience of explanation, the numerical values for the applied row and column voltages are given as 0, +3, and +6, but it will be appreciated that the numerical values for these applied voltages could be shifted together and produce the exact same hold, release, and actuation drive potentials. Only the difference is relevant, not the absolute values.

In the FIG. 5 embodiment, actuating a pixel involves setting the appropriate column to 0, and the appropriate row to +6V. Releasing the pixel is accomplished by setting the appropriate column to +6V, and the appropriate row to the same +6V, producing a zero volt potential difference across the pixel. In those rows where the row voltage is held at 3 volts, the pixels are stable in whatever state they were originally in, regardless of whether the column is at +6V or 0. As is also illustrated in FIG. 5, it will be appreciated that voltages of opposite polarity than those described above can be used, e.g., actuating a pixel can involve setting the appropriate column to +6V, and the appropriate row to 0. In this embodiment, releasing the pixel is accomplished by setting the appropriate column to 0, and the appropriate row to the same 0, producing a zero volt potential difference across the pixel.

Figure 6A:
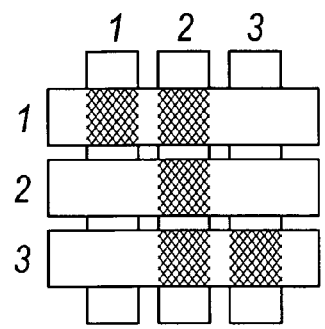
Figure 6B:
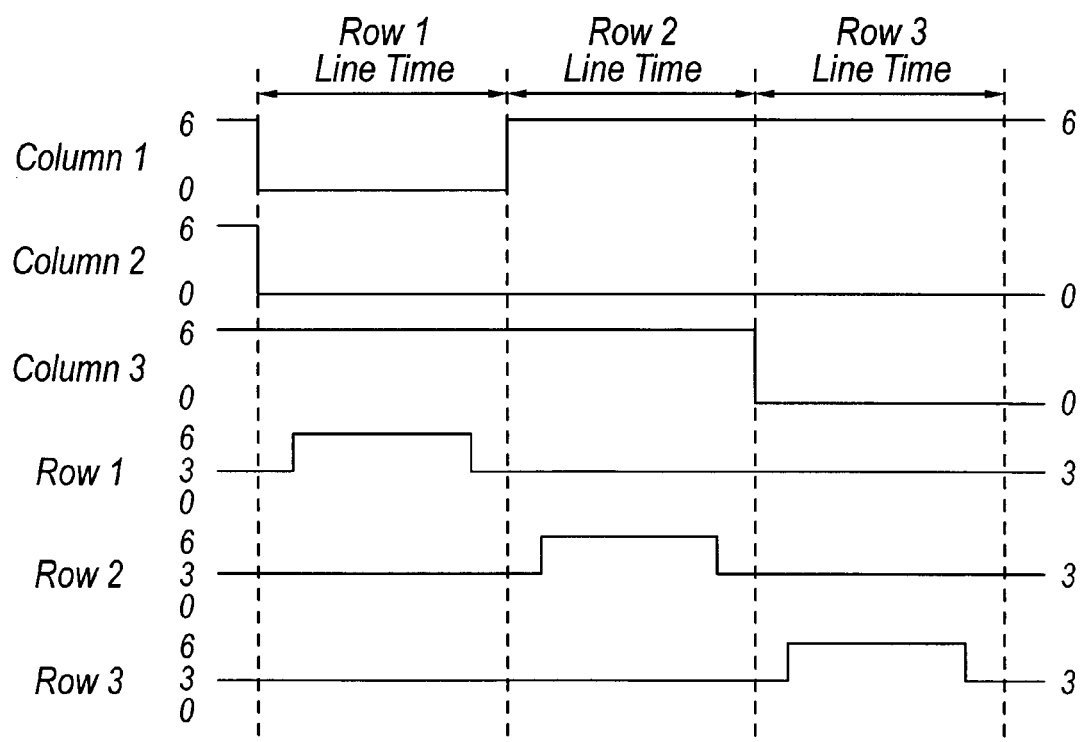

FIG. 6B is a timing diagram showing a series of row and column signals applied to the 3×3 array of FIG. 3 which will result in the display arrangement illustrated in FIG. 6A, where actuated pixels are non-reflective. Prior to writing the frame illustrated in FIG. 6A, the pixels can be in any state, and in this example, all the rows are at 3 volts, and all the columns are at 6 volts. With these applied voltages, all pixels are stable in their existing actuated or released states.

In the FIG. 6A frame, pixels (1,1), (1,2), (2,2), (3,2) and (3,3) are actuated. To accomplish this, during a "line time" for row 1, columns 1 and 2 are set to 0 volts, and column 3 is set to +6 volts. This does not change the state of any pixels, because all the pixels remain in the 2-4 volt stability window. Row 1 is then strobed with a pulse that goes from 3V, up to 6V, and back to 3V. This actuates the (1,1) and (1,2) pixels and releases the (1,3) pixel. No other pixels in the array are affected. To set row 2 as desired, column 2 is set to 0 volts, and columns 1 and 3 are set to +6 volts. The same strobe applied to row 2 will then actuate pixel (2,2) and release pixels (2,1) and (2,3). Again, no other pixels of the array are affected. Row 3 is similarly set by setting columns 2 and 3 to 0 volts, and column 1 to +6 volts. The row 3 strobe sets the row 3 pixels as shown in FIG. 60A. After writing the frame, the row potentials are 3V, and the column potentials can remain at either +6 or 0 volts, and the display is then stable in the arrangement of FIG. 6A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the present invention.

It is one aspect of the above described devices that charge can build on the dielectric between the layers of the device. This can be the result of the manufacturing process and can be caused when the devices are actuated and held in the actuated state by an electric field that predominantly points in the same direction. For example, if the moving layer is always at a higher potential relative to the fixed layer when the device is actuated by potentials having a magnitude larger than the outer threshold of stability, a slowly increasing charge buildup on the dielectric between the layers can begin to shift the hysteresis curve for the device.

FIG. 7 is a diagram of movable mirror position versus applied voltage showing a hysteresis characteristic similar to that shown in FIG. 4. The Hysteresis characteristic shown in FIG. 7, however, is not centered about 0v, but is shifted by an offset $\delta V$, where $\delta V$ is the potential difference at the center of the hysteresis curve. Such an offset can be the result of design, manufacturing, environment and/or operation history. The numerical value for $\delta V$ could be either positive or negative.

If $\delta V$ is not too large, a MEMS device with the characteristic shown in FIG. 7 may still be driven with the column and row voltages shown in FIG. 5. However, driving the device with positive and negative drive potential differences which are not at the same location within the hysteresis curve can result in certain undesirable performance characteristics. For example, in addition to the aforementioned charge buildup, light modulation characteristics when the movable mirror is actuated with the positive actuation potential may be different from the light modulation characteristics when the movable mirror is actuated with the negative actuation potential. This can occur because the effective electrostatic force on the movable mirror will depend on the absolute value of the difference between the driven potential difference and $\delta V$, the potential difference at the center of the hysteresis curve.

FIG. 8 is a table showing column and row voltages used to create a set of preferred drive potentials for the embodiment of FIG. 7, where each drive potential is the difference between the associated column voltage and the associated row voltage. As shown, the column voltages are $6V+\delta V$ and $0V+\delta V$, and the row voltages are 3V, 6V, and 0V, and are used to create the preferred positive and preferred negative actuation potentials ($+6V+\delta V$ and $-6V+\delta V$), the preferred positive and preferred negative hold potentials ($+3V+\delta V$ and $-3V+\delta V$), and the preferred release potential ($0V+\delta V$). These values are advantageous because each of the positive and negative actuation potentials, positive and negative release potentials, and positive and negative hold potentials are symmetric about $\delta V$. This results in at least the benefits of charge accumulation balancing within each interferometric modulator, and substantially identical light modulation characteristics at both positive and negative polarity signals.

Comparison of the column and row voltages of FIGS. 5 and 8 shows that the number of different supply voltages needed for the row and column signals increases when there is an offset. With no offset, the column and row voltages are each one of three supply voltages, 0V, 3V, and 6V. However, with an offset $\delta V$, the column and row voltages are each one of five supply voltages, 0V, 0V+$\delta V$, 3V, 6V, and 6V+$\delta V$. Adding supply voltages increases the complexity of supply generation and distribution, and may increase power consumption.

Alternate sets of drive potential reducing the number of supply voltages while avoiding the undesirable performance characteristics are now presented.

FIG. 9 is a table showing column and row voltages used to create a set of alternate drive potentials for an interferometric modulator with an offset $\delta V$, and with a hysteresis curve as shown in FIG. 7, where each drive potential is the difference between the associated column voltage and the associated row voltage. As shown, the column voltages are $6V+2\delta V$ and 0V, and the row voltages are 3V, 6V, and 0V, and are used to create alternate positive and alternate negative actuation potentials (+6V+2δV and −6 V), alternate positive and alternate negative hold potentials (+3V+2δV and −3V), and alternate positive and alternate negative release potentials (0V and 0V+2δV). This scheme advantageously uses only four supply voltages 0V, 3V, 6V, and 6V+2δV. Additionally, although the alternate drive potentials differ from the preferred drive potentials, undesirable performance characteristics due to asymmetric drive potentials are avoided because each pair of positive and negative drive voltages is symmetric about the preferred drive voltages, and therefore symmetric about the offset voltage δV. That is, the alternate positive and alternate negative actuation potentials, +6V+2δV and −6V, are symmetric about the preferred positive and preferred negative actuation potentials, +6V+δV and −6V+δV, the alternate positive and alternate negative hold potentials, +3V+2δV and −3V, are symmetric about the preferred positive and preferred negative hold potentials, +3V+δV and −3V+δV, and the alternate positive and alternate negative release potentials, 0V and 0V+2δV, are symmetric about the preferred release potential, 0V+δV. Thus, column and row voltages of FIG. 9 may be used to create a set of alternate drive potentials for an interferometric modulator with an offset δV and with a hysteresis curve as shown in FIG. 7, with use of four supply voltages and with the advantageous performance characteristics associated with symmetric drive potentials, such as charge buildup reduction and substantially identical light modulation characteristics regardless of signal polarity.

FIG. 10 is a table showing column and row voltages used to create another set of alternate drive potentials for an interferometric modulator with an offset δV, with a hysteresis curve as shown in FIG. 7, where each drive potential is the difference between the associated column voltage and the associated row voltage. As shown, the column voltages are 6V and 0V, and the row voltages are 3V−δV, 6V, and 0V−2δV, and are used to create alternate positive and alternate negative actuation potentials (+6V+2δV and −6V), alternate positive and alternate negative hold potentials (+3V+δV and −3V+δV), and alternate positive and alternate negative release potentials (0V+2δV and 0V). This scheme advantageously uses only four supply voltages 0V−δV, 0V, 3V−δV, and 6V. Similar to the alternate drive potentials shown in FIG. 9, even though the alternate drive potentials of FIG. 10 differ from the preferred drive potentials, undesirable performance characteristics due to asymmetric drive potentials are avoided because each pair of positive and negative drive voltages is symmetric about the preferred drive voltages, and therefore symmetric about the offset voltage δV. That is, the alternate positive and alternate negative actuation potentials, +6V+2δV and −6V, are symmetric about the preferred positive and preferred negative actuation potentials, +6V+δV and −6V+δV, the alternate positive and alternate negative hold potentials, +3V+δV and −3V+δV, are symmetric about, and in fact identical to, the preferred positive and preferred negative hold potentials, +3V+δV and −3V+δV, and the alternate positive and alternate negative release potentials, 0V and 0V+2δV, are symmetric about the preferred release potential, 0V+δV. The set of alternate drive potentials of FIG. 10 has an advantageous aspect that the positive and negative hold potentials are identical to the preferred positive and negative hold potentials. Thus, column and row voltages of FIG. 10 may be used to create a set of alternate drive potentials for an interferometric modulator with an offset δV and with a hysteresis curve as shown in FIG. 7, with use of four supply voltages and with the advantageous performance characteristics associated with symmetric drive potentials, such as charge buildup reduction and substantially identical light modulation characteristics regardless of signal polarity. It will be understood that in the above discussion the terms row and column are arbitrarily chosen to each represent a separate dimension in an array. Rows and columns are not meant to be relative to any fixed reference. Accordingly, rows and columns may be interchanged.

FIGS. 11A and 11B are system block diagrams illustrating an embodiment of a display device 40 in which the inventions described herein may be implemented. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding and vacuum forming. In addition, the housing 41 may be made from any of a variety of materials, including, but not limited to, plastic, metal, glass, rubber, and ceramic, or a combination thereof. In one embodiment, the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 11B. The illustrated exemplary display device 40 includes a housing 41 and can include additional components at least partially enclosed therein. For example, in one embodiment, the exemplary display device 40 includes a network interface 27 that includes an antenna 43, which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28 and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment, the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, or a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell including a plastic solar cell, and solar-cell paint. In another embodiment, power supply 50 is configured to receive power from a wall outlet.

In some embodiments, control programmability resides, as described above, in a driver controller which can be located in several places in the electronic display system. In some embodiments, control programmability resides in the array driver 22. Those of skill in the art will recognize that the above-described optimizations may be implemented in any number of hardware and/or software components and in various configurations.

It will also be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A method of writing data to a display device comprising a set of MEMS display elements configured as an array of rows and columns of MEMS elements, said method comprising:

generating a first voltage level, a second voltage level, a third voltage level, and a fourth voltage level to be applied to the rows and columns; and writing display data to the array by applying no more than the first, second, third, and fourth voltage levels to the columns and rows of the array so as to apply first and second actuation potential differences, first and second hold potential differences, and first and second release potential differences, and wherein the first and second hold potential differences are of opposite polarity and are symmetric about a non-zero offset δV, wherein the MEMS elements are characterized by a preferred set of drive potential differences comprising preferred positive and preferred negative actuation potential differences, preferred positive and preferred negative hold potential differences, and a preferred release potential difference, wherein the preferred set of drive potential differences is symmetric about the non-zero offset δV and wherein drive potential differences are applied to each MEMS element as a difference between a column voltage and a row voltage, and wherein no more than two of the first, second, third, and fourth voltage levels are applied to the columns and no more than three of the first, second, third, and fourth voltage levels are applied to the rows, and wherein the no more than three voltage levels voltages and the no more than two voltage levels share one common voltage level.

2. The method of claim 1, wherein said first hold potential is a positive polarity such that the column is at a higher potential than the row, and wherein said second hold potential is a negative polarity such that the row is at a higher potential than the column.

3. The method of claim 1, wherein δV is a positive value.

4. The method of claim 1, wherein δV is a negative value.

5. The method of claim 1, wherein one of the no more than three voltage levels three voltages is shifted from one of the no more than two voltage levels by about 2δV.

6. The method of claim 1; wherein the common voltage is about 0V.

7. The method of claim , wherein the common voltage is about 5V or more.

8. The method of claim 1, wherein the first and second actuation potential differences are symmetric about the offset voltage δV.

9. The method of claim 1, wherein the first and second release potential differences are symmetric about the offset voltage δV.

10. A microelectromechanical system (MEMS) display device comprising:
an array of rows and columns of MEMS elements, wherein the MEMS elements are characterized by a preferred set of drive potential differences comprising preferred positive and preferred negative actuation potential differences, preferred positive and preferred negative hold potential differences, and a preferred release potential difference, wherein the preferred set of drive potential differences is symmetric about a voltage differing from 0V by a nonzero offset δV; and
an array driver configured to write display data to the array by applying no more than first, second, third, and fourth voltage levels to the rows and columns of the array so as to apply first and second actuation potential differences, first and second hold potential differences, and first and second release potential differences, wherein first and second hold potentials are of opposite polarity and are symmetric about the non-zero offset δV,
wherein the array controller is configured to apply no more than two of the first, second, third, and fourth voltage levels are applied to the columns and no more than three of the first, second, third, and fourth voltage levels are applied to the rows, and wherein the no more than three voltage levels voltages and the no more than two voltage levels share one common voltage level.

11. The device of claim 10, wherein said first hold potential is a positive polarity such that the column is at a higher potential than the row, and wherein said second hold potential is a negative polarity such that the row is at a higher potential than the column.

12. The device of claim 10, wherein δV is a positive value.

13. The device of claim 10, wherein δV is a negative value.

14. The device of claim 10, wherein one of no more than three voltage levels is shifted from one of the no more than two voltage levels by about 2δV.

15. The device of claim 10, wherein the common voltage is about 0 V.

16. The device of claim 10, wherein the common voltage is about 5V or more.

17. The device of claim 10, wherein the first and second actuation potential differences are symmetric about the offset voltage δV.

18. The device of claim 10, wherein the first and second release potential differences are symmetric about the offset voltage δV.

19. The device of claim 10, further comprising:
a processor that is configured to communicate with said display, said processor being configured to process image data; and
a memory device that is configured to communicate with said processor.

20. The device of claim 19, further comprising a controller configured to send at least a portion of the image data to the driver circuit.

21. The device of claim 19, further comprising an image source module configured to send said image data to said processor.

22. The device of claim 21, wherein the image source module comprises at least one of a receiver, transceiver, and transmitter.

23. The device of claim 19, further comprising an input device configured to receive input data and to communicate said input data to said processor.

24. A method of driving a display device comprising a set of MEMS display elements configured as an array of rows and columns of MEMS elements, the method comprising:
generating a first voltage level, a second voltage level, a third voltage level, and a fourth voltage level to be applied to the rows and columns;
writing display data to the array by applying no more than the first, second, third, and fourth voltage levels to the columns and rows of the array so as to apply first and second actuation potential differences, first and second hold potential differences, and first and second release potential differences, and wherein at least one of the first and second actuation potentials, the first and second hold potentials, and the first and second release potentials are of opposite polarity and are symmetric about a voltage differing from 0V by a nonzero offset δV,
wherein said MEMS elements are characterized by a preferred set of drive potential differences comprising preferred positive and preferred negative actuation potential differences, preferred positive and preferred negative hold potential differences, and a preferred release potential difference, wherein the preferred set of drive potential differences is symmetric about the offset voltage δV and wherein drive potential differences are applied to each MEMS element as a difference between a column voltage and a row voltage, and
wherein no more than two of the first, second, third, and fourth voltage levels are applied to the columns and no more than three of the first, second, third, and fourth voltage levels are applied to the rows, and wherein the no more than three voltage levels voltages and the no more than two voltage levels share one common voltage level.

25. The method of claim 24, wherein said first hold potential is a positive polarity such that the column is at a higher potential than the row, and wherein said second hold potential is a negative polarity such that the row is at a higher potential than the column.

26. The method of claim 24, wherein δV is a positive value.

27. The method of claim 24, wherein δV is a negative value.

28. The method of claim 24, wherein each of the first and second actuation potentials, the first and second hold potentials, and the first and second hold potentials are of opposite polarity and are symmetric about the offset voltage δV.

29. The method of claim 24, wherein the light modulation characteristics of each MEMS display element when driven with a positive polarity potential is substantially identical to the light modulation characteristics when driven with a negative polarity potential.

30. The method of claim 24, wherein one of the first, second, third, and fourth voltage levels is substantially equal to 0V.

31. The method of claim 30, wherein each of said first and second actuation potential differences, first and second hold potential differences, first and second release potential differences, preferred positive and preferred negative actuation potential differences, preferred positive and preferred negative hold potential differences, and preferred release potential difference comprises a difference between a voltage applied to a column electrode of a MEMS display element in the array and a voltage applied to a row electrode of the MEMS display element.

32. A microelectromechanical system (MEMS) display device comprising:
   means for displaying rows and columns of image data, wherein said means are characterized by a preferred set of drive potential differences comprising preferred positive and preferred negative actuation potential differences, preferred positive and preferred negative hold potential differences, and a preferred release potential difference, wherein the preferred set of drive potential differences is symmetric about a voltage differing from 0V by a nonzero offset δV; and
   means for writing image data to the means for displaying by applying no more than first, second, third, and fourth voltage levels to the rows and columns of the array so as to apply first and second actuation potential differences, first and second hold potential differences, and first and second release potential differences, wherein first and second hold potentials are of opposite polarity,
   wherein no more than two of the first, second, third, and fourth voltage levels are applied to the columns and no more than three of the first, second, third, and fourth voltage levels are applied to the rows, and wherein the no more than three voltage levels voltages and the no more than two voltage levels share one common voltage level.

33. The device of claim 32, wherein said means for displaying comprises an array of MEMS elements configured as interferometric modulators.

34. The device of claim 33, wherein said means for writing image data comprises an array driver circuit.

* * * * *